Patented July 22, 1952

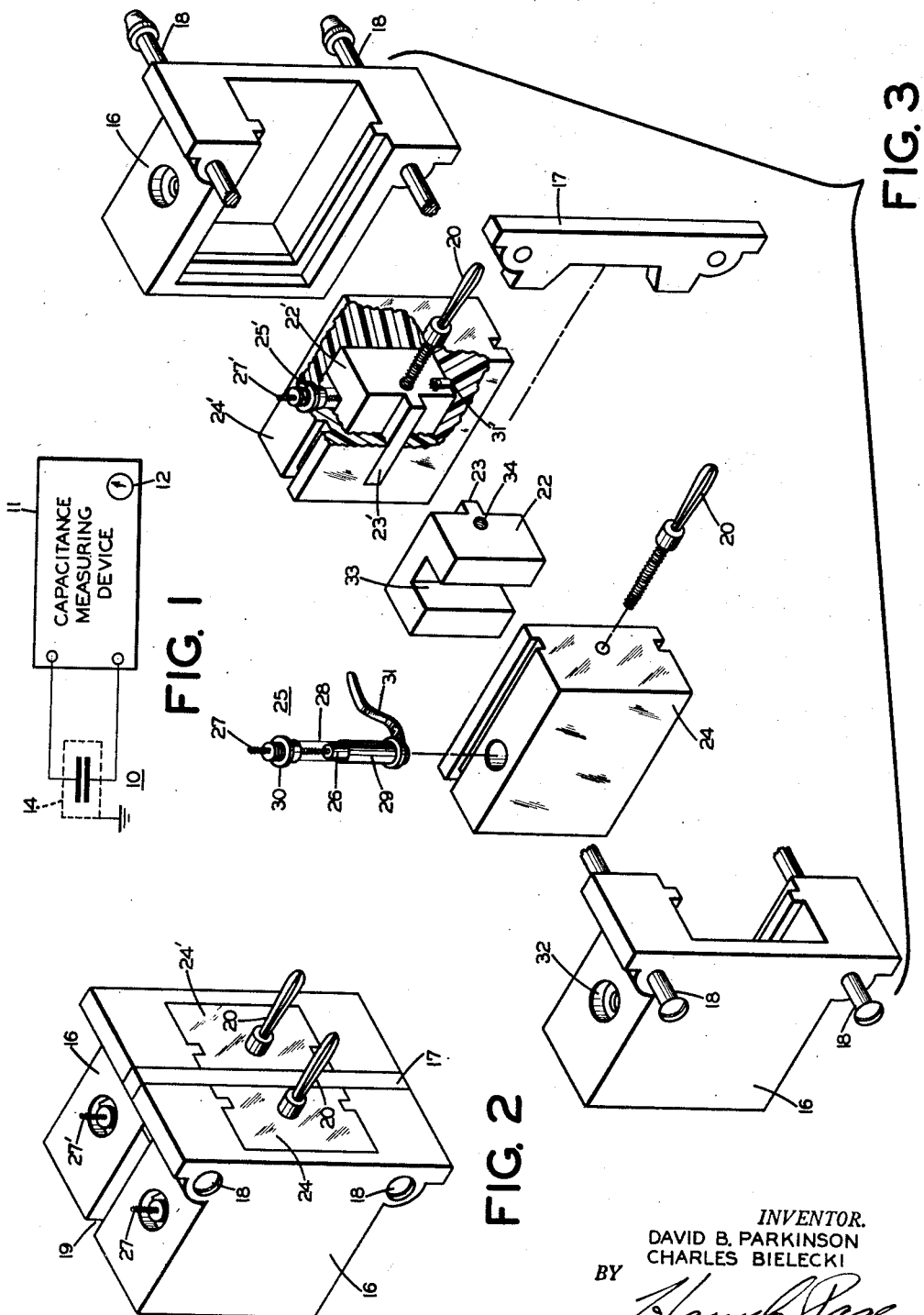

2,604,513

UNITED STATES PATENT OFFICE 2,604,513

CAPACITIVE MEASURING HEAD

David B. Parkinson, Cleveland Heights, and Charles Bielecki, Parma, Ohio, assignors to The Brush Development Company, Cleveland, Ohio, a corporation of Ohio Application July 25, 1951, Serial No. 238,408

8 Claims. (Cl. 175—183)

The present invention relates, in general, to a capacitive measuring head for testing materials by the measurement of a capacitive effect of the material being tested and relates particularly to such a head which is used for the testing of yarns, roving, and sliver in textile manufacturing processes.

Various prior-art processes have utilized devices for measuring the capacitive effect of a material in order to test some quality or characteristic of the material. For example, it has been proposed to use such measurements to test the uniformity of yarns, roving, and sliver in the manufacturing of textiles. By such measurements, the uniformity of the yarns, roving, or sliver can be measured or recorded and, in recent years, some such devices have come into a considerable extent of use. In such arrangements, it has been the practice to cause the material being tested to run between the plates of a condenser and the capacitance of the condenser, or variations in capacitance thereof, have been measured and used to indicate the desired characteristic of the material. However, since the condenser involved is one having an air dielectric and, inasmuch as the dielectric constant of materials of the type under consideration which are to be tested is very close to that of air, it is necessary to measure in such devices very small changes in capacitance. For this reason, it has been found necessary to fix the spacing between the condenser plates to provide the best results for the material to be tested. Since the thickness of gauge of such materials of different types varies over a relatively wide extent, it is frequently necessary to provide, in testing devices of the type here under consideration, a plurality of different measuring heads having air gaps of several different dimensions. However, since the capacitance measurements being made are so very critical, great difficulty is encountered in making an arrangement which has identical characteristics with an assortment of measuring heads having air gaps of different sizes. Particularly, it is desired that the indicating device associated with the capacitance measuring equipment indicate a zero value in the absence of any material being tested, even though the measuring heads used with the equipment have air gaps which vary over a rather wide range of values. If this is not done, it is necessary to make precise adjustments to the equipment each time the air gap is changed in order to provide this zero reading.

Furthermore, since the capacitance variations to be measured are so very small, it is very difficult to provide a testing head for the purposes under consideration which is sufficiently stable mechanically or sufficiently stable with temperature variations that such changes are not of the same order of magnitude as those to be measured in testing the material.

Applicants have provided a capacitive measuring head for testing materials by the measurement of a capacitive effect of the material being tested which eliminates or reduces to a minimum the difficulties mentioned above.

It is an object of the invention, therefore, to provide an improved capacitive measuring head for testing materials by the measurement of a capacitive effect of the materials being tested.

It is still another object of the invention to provide an improved capacitive measuring head which is very rigid mechanically and in which capacitive variations with temperature are reduced to a minimum.

It is still another object of the invention to provide a capacitive measuring head for the testing of materials by the measurement of a capacitive effect of the materials being tested which is interchangeable with other heads having air gaps of different size and in which the adjustments to an instrument indicating capacitance variations of the material being tested are eliminated, or made very simple, and a null reading on the capacitance measuring device is provided in all cases where the material being measured is not present.

For a better understanding of the present invention, together with other and further objects thereof, reference is had to the following description taken in connection with the accompanying drawings, and its scope will be pointed out in the appended claims.

Fig. 1 of the drawings illustrates the general type of equipment to which the present invention pertains; Fig. 2 illustrates a capacitive measuring head constructed in accordance with the invention; and Fig. 3 is an exploded view of the various parts which go into the assembly of the Fig. 2 arrangement.

Referring now more particularly to Fig. 1, there is shown a measuring head 10 which can be used for the testing of materials by the measurement of a capacitive effect of the material being tested. The device 10 effectively comprises two condenser plates and the material to be tested is placed between these condenser plates and the variation of capacitance when the material is introduced between the condenser plates, or as various lengths of the material are successively drawn through the condenser plates, is used as an indication of the quality of the material. The capacitance of the condenser may be measured by any suitable arrangement such as the capacitive measuring device 11. The measuring device has associated therewith a meter 12 which has a zero reading in the absence of the presence of a material to be tested between the plates of the condenser.

Since, as mentioned above, the capacitance changes in a system of the type here under consideration are generally very small, it is necessary generally to shield the measuring condenser from external effects; for example, by means of a shield as indicated by the numeral 14 of Fig. 1. Also, it is frequently desirable that the plates of the condenser be electrically balanced with reference to ground and such an arrangement is provided by many of the prior-art capacitance measuring devices.

Applicants' capacitive measuring head is illustrated in Fig. 2 and effectively comprises two very rigid conducting housings 16, 16 which are spaced by a heavy metal spacer 17 and held together by means of screws 18, 18 to provide an air gap 19 into which the material to be tested is placed. Applicants' measuring head is readily interchangeable with other measuring heads having different gap widths in that prongs 20, 20 are provided for plugging the measuring head into an electrical circuit. Reference is made to Fig. 3 for a more detailed description of the measuring head of applicants' invention.

Fig. 3 is an exploded view of all of the parts which are contained in the device of Fig. 1. Elements in Fig. 3 which are similar to those of Fig. 1 bear identical reference numerals. The electrodes illustrated in Fig. 2 are of relatively heavy construction and one of these is illustrated in Fig. 3 by the reference numeral 22. This electrode is preferably of metal and has an operating face 23 and other surfaces which have a combined area much greater than the area of the operating face. In order to hold the electrode very rigidly in position, the electrode 22 is placed in the housing 16 and held in position by means of a plastic material, for example of the thermosetting type, the plastic material being poured around the electrode 22 while it is in position in the housing 16. After the plastic sets, it has a shape as represented by the element 24 of Fig. 3, although it will be understood that it is physically impossible to remove the plastic material from the housing 16 after the plastic material has set and that it is shown separately in Fig. 3 solely for purposes of illustration. This element is preferably of a low-loss dielectric material which has a dielectric constant which is relatively stable with temperature changes over the temperature range at which materials are to be tested in the measuring head of the invention. In order to provide a capacitance adjustment between the electrode 22 and the housing 16, a trimmer condenser 25 is provided. This condenser effectively comprises a metal slug 26, the position of which can be moved by means of a threaded member 27. The slug 26 is enclosed in a glass shell 28 and metal member 29 is provided at one end thereof and a threaded cap 30 is provided at the other end thereof. The member 29 is provided with an electrical lead 31.

In assembling the portions of the Fig. 3 arrangement which have so far been described, the procedure is as follows: The trimmer condenser 25 is placed inside the metal housing 16 and the threaded member 27 is brought out through the hole 32. The electrode 22 is then placed in the metal shell 16. A nut is threaded from outside the housing 16 onto the threaded member 30 thus effectively holding the trimmer condenser in place. The electrode 22 is next placed in the housing 16 with the channel portion 33 thereof effectively surrounding the trimmer condenser 25. The plug 29 is next screwed into a tapped hole 34 in electrode 22. The dielectric material to be utilized is then poured into the casing 16 around the electrode 22 and allowed to harden.

The assembly of the other electrode of the device 22' in its dielectric material 24' is also illustrated in Fig. 3. Other portions of the remaining housing, electrode and dielectric material which are similar to those which have been described in detail, have similar reference numerals primed. The lead 31' is illustrated as being affixed to the electrode 22', as by soldering.

It will be understood that the two halves of the measuring head of Fig. 3 are in all respects similar. As so far described then, the arrangement of Fig. 3 comprises the two casings 16, 16', each of which has therein the block of dielectric material 24 or 24' and these blocks of dielectric material, respectively, hold in position the electrodes 22 and 22'.

The whole arrangement is next assembled by means of screws 18, 18 and by means of the spacer 17 to provide a completed measuring head in accordance with the invention.

The elements 24 and 24' are preferably of a low-loss dielectric material which has a dielectric constant which is relatively stable with temperature over the range at which materials are to be tested in the apparatus. This dielectric material should also be mechanically stable with temperature changes, and it has been found that some polystyrenes are very satisfactory for the intended purpose. In one preferred embodiment of the invention, applicants have used a material made in accordance with the following formula and its use has been found to be very satisfactory:

Ingredients by weight:
    Clear polystyrene granules, approx. 62% (50 to 70)
    Styrene monomer, approx. 32% (25 to 35)
    Hydrogenated terphenyl, approx. 5% (2 to 8)
    Di-vinyl benzine (solution), approx. ¼% ($\frac{1}{10}$ to 1)
    Benzoyl peroxide-catalyst, approx. $\frac{1}{16}$% ($\frac{1}{20}$ to ½)

The actual percentages are not particularly critical. Curing takes place in an oven at relatively low temperature (70° C.) and is accomplished in 24 hours. Higher temperatures will speed up the curing process, but there is greater danger of evaporation and consequent deformation. Polymerization molding, as opposed to injection molding is less destructive to the insert trimmer capacitor and the positioning of the electrode.

The electrical losses in this material are very small, the material having a power factor of 0.0003 at 7½ megacycles and having a dielectric constant of about 2.55.

It will also be seen that the metal housings 16, 16, substantially completely surround the electrodes 22, 22', resspectively. This has the effect of providing an electrostatic shield which performs the function of shield 14 of Fig. 1. It will furthermore be seen that the member 17 effectively comprises a metal shim and that this shim can be machined very precisely to the required gap width for the measuring head before it is inserted in the structure. Therefore, all that is necessary in order to make measuring heads of various gap widths is to provide the different heads with shims of the various desired thicknesses.

The capacity between electrodes 22, 22' varies considerably with the thickness of shim 17. It is necessary in order for the capacitance measuring device, which may be of the nature of the element 11 of Fig. 1, to read zero for any of the various heads which may be used, to have the capacitance between electrodes 22, 22' adjustable as between the various heads. In other words each measuring head used with the capacitance measuring device 11 must present thereto the same value of capacitance in the absence of a material to be tested. It is for this reason, among others, that the trimmer condensers 25, 25' are provided.

In a preferred embodiment of the invention, the trimmer condensers have a capacitance which is adjustable over the range from 20 to 30 micro microfarads. Also, in providing an instrument which is suitable for the testing of most yarns, roving and sliver, it is desirable to provide an arrangement which, for the various shims 17 utilized, has a capacitance at terminals 20, 20 which, is within the range of 0.3 to 3.0 micro microfarads.

What is claimed is:

1. A capacitive measuring head for testing materials by the measurement of a capacitive effect of the material being tested comprising: two conductive electrodes, each having a relatively flat operating face; two elements of low-loss dielectric material which has a dielectric constant which is relatively stable with temperature changes over the temperature range at which said materials are to be tested, each of said elements substantially surrounding one of said electrodes except for its operating face; two rigid conducting housings, each substantially enclosing one of said elements and its enclosed electrode but leaving said face of said enclosed electrode substantially exposed; means for rigidly mounting said housings with said electrode faces in an opposed fixed stable relationship and with a conductive connection between said housings; means extending through each said housing for connecting an external circuit to said electrodes; and a separate trimmer condenser between each said housing and its enclosed electrode.

2. A capacitive measuring head for testing materials by the measurement of a capacitive effect of the material being tested comprising: two conductive electrodes, each having a relatively flat operating face and other surfaces which have a combined area much greater than that of the area of said operating face; two elements of low-loss dielectric material which has a dielectric constant which is relatively stable with temperature changes over the temperature range at which said materials are to be tested, each of said elements substantially surrounding one of said electrodes except for its operating face; two rigid conducting housings, each substantially enclosing one of said elements and its enclosed electrode but leaving said face of said enclosed electrode exposed; means for rigidly mounting said housings with said electrode faces in an opposed fixed stable relationship and with a conductive connection between said housings; means extending through each said housing for connecting an external circuit to said electrodes; and a separate trimmer condenser between each said housing and its enclosed electrode.

3. A capacitive measuring head for testing materials by the measurement of a capacitive effect of the material being tested comprising: two conductive electrodes, each having a relatively flat operating face; two structurally unitary elements of low-loss dielectric material which has a dielectric constant which is relatively stable with temperature changes over the temperature range at which said materials are to be tested, each of said elements substantially surrounding one of said electrodes except for its operating face; two rigid conducting housings, each substantially enclosing one of said elements and its enclosed electrode but leaving said face of said enclosed electrode exposed; means for rigidly mounting said housings with said electrode faces in an opposed fixed stable relationship and with a conductive connection between said housings; means extending through each said housing for connecting an external circuit to said electrodes; and a separate trimmer condenser between each said housing and its enclosed electrode.

4. A capacitive measuring head for testing materials by the measurement of a capacitive effect of the material being tested comprising: two conductive electrodes, each having a relatively flat operating face; two elements of low-loss dielectric material which has a dielectric constant which is relatively stable with temperature changes over the temperature range at which said materials are to be tested, each of said elements substantially surrounding one of said electrodes except for its operating face and being substantially flush with said operating face; two rigid conducting housings, each substantially enclosing one of said elements and its enclosed electrode and being substantially flush with said operating face of said enclosed electrode but leaving said face of said enclosed electrode exposed; means for rigidly mounting said housings with said electrode faces in an opposed fixed relationship and with a conductive connection between said housings; means extending through said housing for connecting an external circuit to said electrodes; and a separate trimmer condenser between each said housing and its enclosed electrode.

5. A capacitive measuring head for testing materials by the measurement of a capacitive effect of the material being tested comprising: two conductive electrodes, each having a relatively flat operating face; two elements of low-loss dielectric material which has a dielectric constant which is relatively stable with temperature changes over the temperature range at which said materials are to be tested, each of said elements substantially surrounding one of said electrodes except for its operating face; two rigid conducting housings, each substantially enclosing one of said elements and its enclosed electrode but leaving said face of said enclosed electrode exposed; means including a dimensionally stable spacer for rigidly mounting said housings with said electrode faces in an opposed fixed relationship and with a conductive connection between said housings; means extending through each said housing for connecting an external circuit to said electrodes; and a separate trimmer condenser between each said housing and its enclosed electrode.

6. A capacitive measuring head for testing materials by the measurement of a capacitive effect of the material being tested comprising: two conductive electrodes, each having a relatively flat operating face; two elements of low-loss dielectric material which has a dielectric constant which is relatively stable with temperature range at which said materials are to be tested, each of said elements substantially surrounding one of said electrodes except for its operating face; two rigid conducting housings, each substantially enclosing one of said elements and its enclosed electrode but leaving said face of said enclosed electrode exposed; means including a conductive spacer for rigidly mounting said housings with said electrode faces in an opposed fixed relationship and with a conductive connection between said housings; means extending through said housing for connecting an external circuit to said electrodes; and a separate trimmer condenser between each said housing and its enclosed electrode.

7. A capacitive measuring head for testing materials by the measurement of a capacitive effect of the material being tested comprising: two conductive electrodes, each having a relatively flat operating face; two elements of low-loss dielectric material which has a dielectric constant which is relatively stable with temperature changes over the temperature range at which said materials are to be tested, each of said elements substantially surrounding one of said electrodes except for its operating face; two rigid conducting housings, each substantially enclosing one of said elements and its enclosed electrode but leaving said face of said enclosed electrode exposed; means for rigidly mounting said housings with said electrode faces in an opposed fixed stable relationship and with a conductive connection between said housings; means extending through each said housing for connecting an external circuit to said electrodes; and a separate trimmer condenser having a temperature-capacitance characteristic which is relatively stable over said temperature range between each said housing and its enclosed electrode.

8. A capacitive measuring head for testing materials by the measurement of a capacitive effect of the material being tested comprising: two conductive electrodes, each having a relatively flat operating face; two elements of low-loss dielectric material which has a dielectric constant which is relatively stable with temperature changes over the temperature range at which said materials are to be tested, each of said elements substantially surrounding one of said electrodes except for its operating face; two rigid conducting housings, each substantially enclosing one of said elements and its enclosed electrode but leaving said face of said enclosed electrode exposed; means for rigidly mounting said housings with said electrode faces in an opposed fixed stable relationship and with a conductive connection between said housings; and detachable mounting means extending through each said housing for detachably connecting an external circuit to said electrodes; and a separate trimmer condenser between each said housing and its enclosed electrode.

DAVID B. PARKINSON.
CHARLES BIELECKI.

REFERENCES CITED

The following references are of record in the file of this patent:

UNITED STATES PATENTS

| Number | Name | Date |
| --- | --- | --- |
| 2,535,027 | Anderson | Dec. 26, 1950 |
| 2,555,977 | Kline | June 5, 1951 |